Patented June 3, 1952

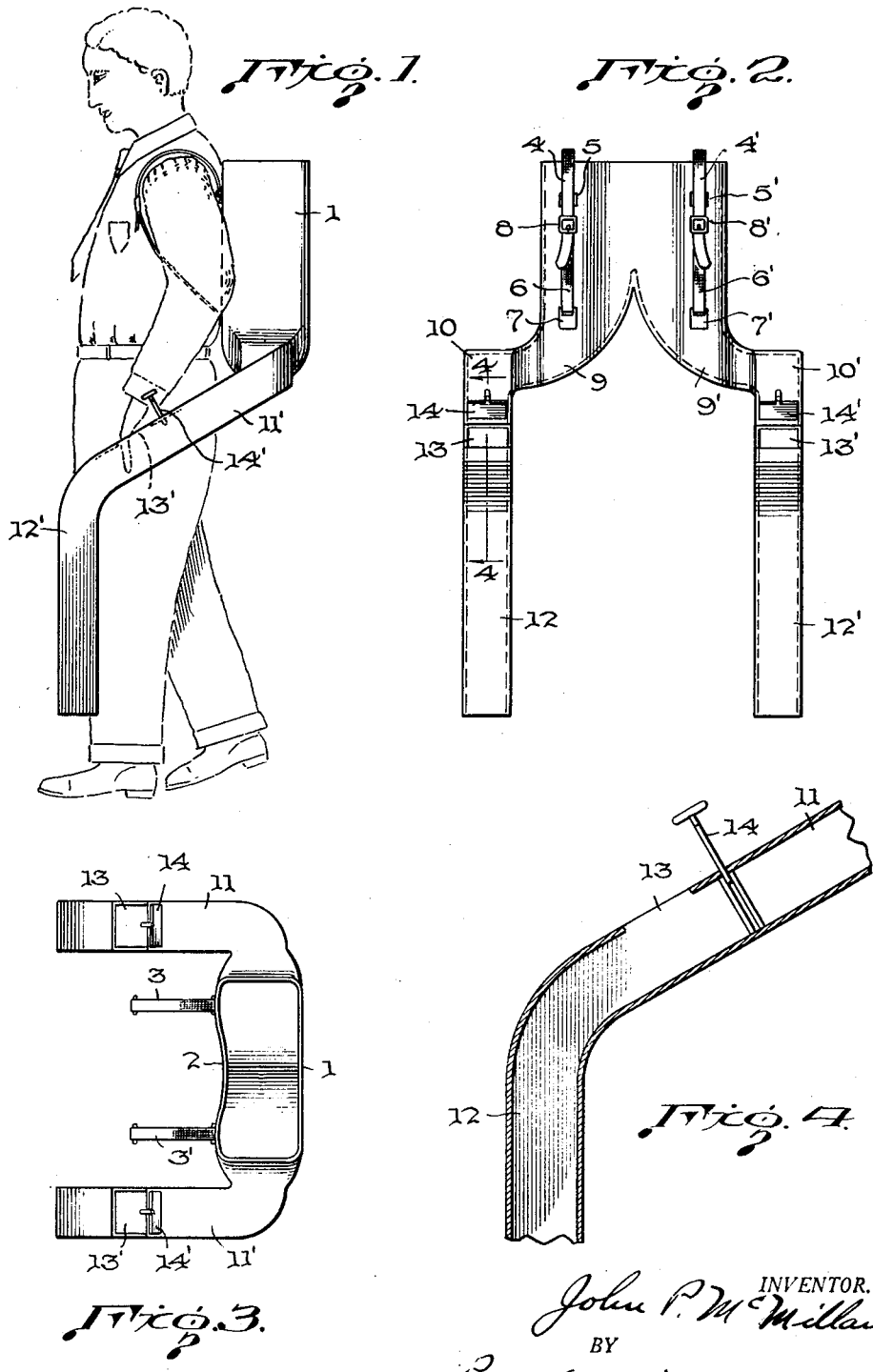

2,599,118

UNITED STATES PATENT OFFICE 2,599,118

FERTILIZER DISTRIBUTOR

John P. McMillan, Kosciusko, Miss.

Application January 14, 1950, Serial No. 138,591

2 Claims. (Cl. 222—175)

This invention relates to an apparatus for the distribution of earth fertilizing material and is particularly adapted for distribution of solid material to adjacent rows of plowed fields for the purpose of improving the plant-nourishing qualities of the earth in such fields.

It has been proposed to provide a tank with straps so that it may be hung from a man's shoulder to rest against his side, the tank having a single spout for dispensing fertilizer material from the tank to the ground alongside the operator's feet as he walks along the rows of a plowed field. It has further been proposed to provide a valve in such a spout for control by the hand of the operator so that the amount of fertilizer to be distributed may be controlled by the operator. However, such an apparatus has the disadvantage that the operator cannot readily see how much fertilizer he is distributing to the row being fertilized. Another disadvantage is that the tank will constantly strike the side of the operator as he progresses along the rows of the field, adding to his discomfort and interfering with the ease of operation of the apparatus.

The fertilizer distributer of the present invention overcomes these disadvantages of the earlier apparatus and also provides other advantages tending toward greater ease of use and more efficient distribution than is possible with distributers of the prior art.

In accordance with the present invention, a tank for a supply of fertilizer has shoulder straps attached to opposite sides of one face of the tank so that the tank may be easily and comfortably carried against an operator's back. The fertilizing material is distributed from the tank through two downspouts, one extending from each side of the tank and forwardly and downwardly so that the fertilizer is directed somewhat ahead of the operator as he walks between adjacent rows of a field, and within his range of vision.

The invention will be further described in connection with the accompanying drawings which illustrate a preferred embodiment of the invention.

In the drawings:

Fig. 1 is a side elevational view of the distributer of the present invention mounted on an operator's back, as when in use.

Fig. 2 is a front view of the apparatus shown in Fig. 1,

Fig. 3 is a plan view of the apparatus, and

Fig. 4 is an enlarged partial sectional view of one of the discharge spouts taken along line 4—4 of Fig. 2.

Referring to the drawings, a tank 1 constitutes a supply receptacle for fertilizer to be distributed and has a front side 2 curved generally to conform to the outline of an operator's back upon which it is adapted to be mounted. Supporting straps 3 and 3' for supporting the tank from the shoulders of an operator are attached to the curved front side 2 adjacent its vertical side edges. As shown in the drawings, the straps comprise upper sections 4 and 4' secured at 5 and 5' in any suitable manner adjacent the upper edges of the front wall 2, and lower sections 6 and 6' similarly attached at 7 and 7' adjacent the lower edge of the front wall 2. The free ends of the upper and lower strap sections are adjustably connected by buckles 8 and 8' so that the length of each strap may be adjusted to most comfortably support the tank upon the back of the particular operator. If desired, straps of fixed length secured at their ends to upper and lower portions of the tank may be used instead of the adjustable straps just described.

The lower portion of the tank 1 is centrally bifurcated to provide downwardly and outwardly curved ducts 9 and 9', one extending toward and beyond each side of the side walls of the tank. The outer protruding ends of the ducts 8 and 8' connect with hollow downspouts 10 and 10'. The downspouts include upper forwardly- and downwardly-extending portions 11 and 11' and lower substantially vertical sections 12 and 12' which are of such length that their lower ends will be positioned close to the ground when the tank is secured upon the back of a person of average height. While the downspouts may be of any desired shape in cross section, I prefer that they be generally rectangular as the flat bottom wall thereby provided permits a somewhat better control of the fertilizer flowing therethrough, as hereinafter described, and also enables the fertilizer to be discharged in more or less sheet-like form.

The curved ducts 9 and 9' extend sufficiently beyond the opposite sides of the tank that the space between the downspouts 10 and 10' is sufficiently wide to enable an operator to stand between them comfortably.

The top walls of the upper portions 11 and 11' of the downspouts are provided with openings or slots 13 and 13' of appropriate size and shape to enable the hands of an operator to extend through them for the purpose of controlling the flow of fertilizer through the downspouts. The openings or slots 13 and 13' preferably are formed in the lower end portions of the portions 11 and 11', where they are most convenient to the operator.

In order that the flow of fertilizer from the tank through the downspouts may be prevented when the apparatus is not in use, or when otherwise not desired by the operator, cut-off valves, here shown as gate valves 14 and 14', extend through the top wall of each downspout upstream from the openings or slots 13 and 13'. The gate valves may be of any suitable form and may be held in their open and closed positions, respectively, frictionally or otherwise.

In operation of the apparatus, the operator first closes the gate valves 14 and 14' to prevent flow of fertilizer through the downspouts and then fills the tank 1 with the fertilizing material to be distributed. The tank then is positioned upon his back, with one of the shoulder straps being passed over each of his shoulders. The lengths of the straps then are adjusted to support the tank on the back of the operator in the most comfortable position. The operator then opens the gate valves 14 and 14' and inserts his fingers through the openings or slots 13 and 13' and with them controls the amount of the fertilizer which is permitted to flow from the upper portions of the downspouts to the vertically-extending lower portions, from which the fertilizer drops onto the ground or along the rows between which the operator may be walking. Any lumps in the fertilizer may be readily broken with the fingers of the operator so that the fertilizer always is distributed in the form of finely-divided discrete particles.

As the downspouts extend forwardly from the tank into the operator's range of vision, he may watch the fertilizer as it is discharged from the lower ends of the downspouts and control the amount of fertilizer supplied at any time with his hands, thereby enabling a greater or less amount of the fertilizer to be distributed as may be required by the particular portion of the row or ground being fertilized.

By having the tank mountable upon the operator's back and downspouts extending therefrom at each side, it may easily and comfortably be carried by the operator and adjacent rows of the field fertilized simultaneously, and in accordance with the needs of each particular row.

While the invention has been described as particularly adapted for the distribution of fertilizer, it is to be understood that it is equally adapted for the distribution of any other material which it may be desired to spread along adjacent rows or portions of the ground.

Various changes may be made in the details of the apparatus as described without departing from the invention or sacrificing the advantages thereof.

I claim:

1. A fertilizer distributor comprising a tank adapted to be carried against an operator's back, a downspout extending downwardly and forwardly from the tank through which fertilizer may be discharged, said downspout extending forwardly a distance sufficient that an operator carrying the tank on his back readily may observe the manner in which fertilizer is discharged from the lower end of the downspout, said downspout having an opening in its upper side of sufficient size that an operator may insert his hand therethrough into the downspout to control the amount of fertilizer discharged from the tank, and a valve in the downspout between the opening therein and the tank operable to prevent flow of fertilizer through the downspout.

2. A fertilizer distributor comprising a tank adapted to be carried against an operator's back, a pair of downspouts extending downwardly and forwardly, one from each side of the tank, through which fertilizer may be discharged, said downspouts being spaced apart a distance sufficient to receive an operator's body and extending forwardly a distance sufficient that an operator carrying the tank on his back may readily observe the manner in which fertilizer is discharged from the lower ends of the downspouts, each of said downspouts having an opening in its upper side of sufficient size that an operator may insert his hand therethrough into the downspout to control the amount of fertilizer discharged from the tank, and a valve in each of the downspouts between the opening therein and the tank operable to prevent flow of fertilizer through the downspouts.

JOHN P. McMILLAN.

REFERENCES CITED

The following references are of record in the file of this patent:

UNITED STATES PATENTS

| Number | Name | Date |
| --- | --- | --- |
| 216,423 | Lewis | June 10, 1879 |
| 260,373 | Erwin | July 4, 1882 |
| 545,480 | Frost | Sept. 3, 1895 |
| 714,051 | Spitzenberg | Nov. 18, 1902 |

FOREIGN PATENTS

| Number | Country | Date |
| --- | --- | --- |
| 107,312 | Australia | Apr. 28, 1939 |